United States Patent
Adams

[11] Patent Number: 5,636,467
[45] Date of Patent: Jun. 10, 1997

[54] FISHING FLOAT

[76] Inventor: James L. Adams, 37 Fremont Dr., Fargo, N. Dak. 58103

[21] Appl. No.: 296,584

[22] Filed: Aug. 29, 1994

[51] Int. Cl.$^6$ .................................................. A01K 93/00
[52] U.S. Cl. ........................ 43/43.13; 43/42.22; 43/42.33
[58] Field of Search .................... 43/43.13, 42.22, 43/42.23

[56] References Cited

U.S. PATENT DOCUMENTS

| | | | |
|---|---|---|---|
| 780,029 | 4/1905 | Flegle | 43/43.13 |
| 2,595,947 | 5/1952 | Jones | 43/43.13 |
| 2,735,213 | 2/1956 | Reeves | 43/43.13 |
| 2,789,386 | 4/1957 | Creelman | 43/43.13 |
| 2,883,787 | 4/1959 | Dahl | 43/43.13 |
| 2,933,848 | 4/1960 | Tollefson | 43/43.13 |
| 3,230,660 | 1/1966 | Meyers | 43/43.13 |
| 3,748,775 | 7/1973 | Wagner | 43/43.13 |
| 4,920,689 | 5/1990 | Anderson | 43/43.13 |
| 5,355,615 | 10/1994 | Spickelmire | 43/43.13 |

*Primary Examiner*—Scott A. Smith
*Assistant Examiner*—Jay A. Stelacone
*Attorney, Agent, or Firm*—Burd, Bartz & Gutenkauf

[57] ABSTRACT

A float body for river fishing and trolling has a longitudinal fin projecting downwardly from the bottom of the float to cut through water being fished to locate the float in desired lateral locations relative to the riverbank or direction of trolling. A spring-loaded locking swivel arm is used to set the desired angle at which the fin cuts through the water. The line exit location is through the fin and approximately at the center of the float body rearwardly from the swivel arm for horizontal stability. The float includes line locking apparatus using ring members secured under spring pressure or by a threaded tightening nut.

23 Claims, 10 Drawing Sheets

FISHING FLOAT

FIELD OF THE INVENTION

This invention is relate to float devices use to buoy up and control the location of the baited end of a fishing line.

BACKGROUND OF THE INVENTION

Conventional fishing corks and floats are commonly used to keep afloat live bait and artificial lures while fishing in both moving and standing water. When using these devices in flowing streams or rivers, oftentimes it is necessary to fish from a bridge or a boat to effectively cover certain areas of the river. When used for trolling, conventional floats are pulled toward the wake of the boat where fish are easily spooked. Planer boards and outriggers are used to spread the lines away from the boat's wake. However, these set-ups are cumbersome and require substantial tackle and are generally limited to use with larger power boats.

SUMMARY OF THE INVENTION

The invention is directed to a float attached to a fishing line adapted to control the movement and location of a fishing lure or bait in a body of water, such as a lake or a river. The float permits selected areas of water to be fished from transverse positions thereto.

The float has a generally cylindrical body member made of buoyant material having inwardly tapered ends. A generally flat longitudinal fin projecting from the bottom of the body member is operable to cut through water to guide and provide directional stability to the float thereby controlling the location and movement of the baited end of a fishing line. The fin extends downwardly normal to the longitudinal center axis of the body means. The fin has a line holder for holding the fishing line adjacent a middle portion of the body member to horizontally stabilize and balance the float. A one-piece wire having a generally linear first section and an outwardly and rearwardly inclined second section is rotatably mounted on the body member. The body member has a generally tubular bore located along its longitudinal center axis that rotatably accommodates the first section of the wire. A notched cap secured to the body member is engageable with the wire to hold the second section of the wire at selected positions relative to the body member. A coil spring is used to bias the wire into engagement with the cap. The wire is released from the cap when a force is applied against the biasing force of the spring. This allows rotation of the first section so that the second section of the wire can be moved to a different position relative to the body member. The second section of the wire has an outer end located outwardly from the body member. The fishing line is threaded through an opening in the outer end and then downwardly to the rear portion of the body member thereby determining the angle at which the fin cuts through the water and locating the baited end of the line at a desired depth from the surface of the water being fished. A pair of ring members secured to the rear portion of the body member cooperate to grip a selected intermediate portion of the fishing line whereby the baited end is located at the desired water depth.

A modification of the float has a body member having a generally flat longitudinal fin projecting downwardly normal to the longitudinal center axis of the body member. The fin includes means accommodating the fishing line approximately at the middle of the body member so that the float is horizontally stabilized and balanced as it moves through the water. The body member has a generally tubular bore located along the longitudinal center axis thereof accommodating a shaft. A collar rotatably mounted on the shaft carries an arm that can be moved between selected angular positions relative to the body member. Locking means engageable with the shaft releaseably holds the arm at the angular positions relative to the longitudinal axis of the body member. The arm has an outer end located outwardly from the body member and forwardly and above the rear portion of the body member. The outer end has an opening through which the fishing line is threaded. A pair of ring members secured to a rear portion of the body member grip a portion of the fishing line rearwardly from the arm to determine the angle at which the fin cuts through the water and hold the baited end of the line at a desired depth of the water. The arm can be moved to different positions relative to the body member to vary the action of the fishing float.

Another modification of the fishing float has a hollow plastic body member joined to a flat longitudinal keel. The body member and keel are one piece molded plastic parts which enclose an internal air chamber. The lightweight plastic and air chamber maintain the float on the surface of the water with the keel extended downwardly below the body member into the water. The rear portion of the body member has an annular groove accommodating a pair of ring members. The middle portion of the body member supports an arm and releasable locking means for holding the arm at selected lateral angular positions relative to the longitudinal axis of the body member. The outer end of the arm has an opening or slot for a fishing line. The fishing line is threaded through the slot, wrapped between the O-rings, and extended through a hole in the keel to support a bait at the fishing end of the line at a selected elevation in a body of water. The arm can be moved to different lateral positions relative to the body to vary the action of the fishing float and permit the fishing float to be used on the port and starboard sides of the boat.

DESCRIPTION OF THE PREFERRED EMBODIMENTS

Figure 1:
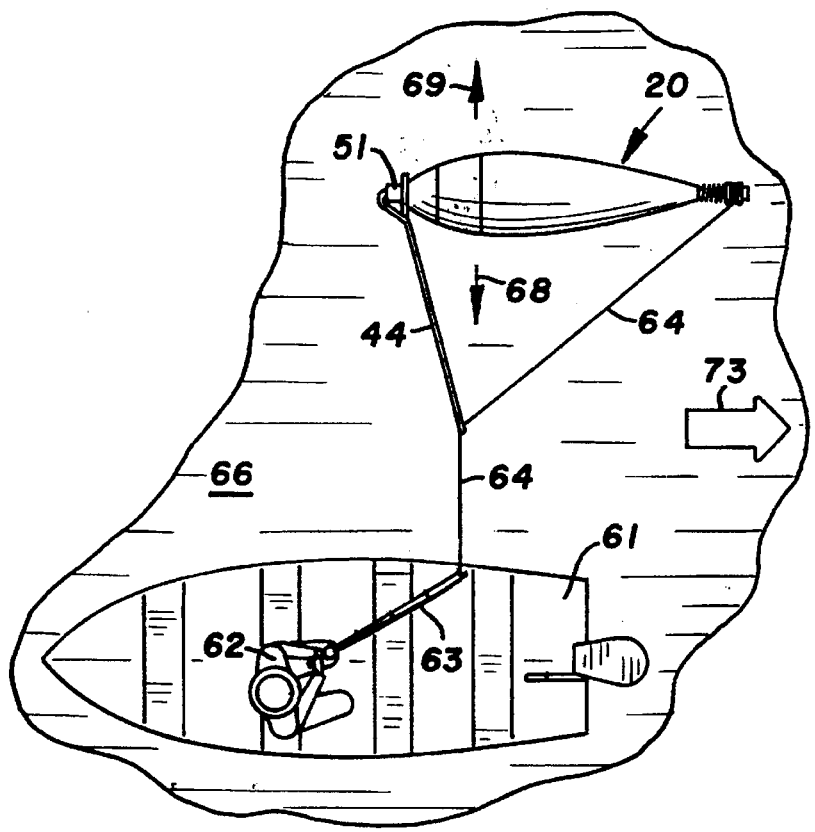
FIG. 1 is a diagrammatic plan view of the fishing float of the invention used by a fisherperson in a river.

Referring to FIGS. 1 to 6, there is shown a fishing float of the invention indicated generally at 20 useable to guide the baited end 67 of a fishing line 64 to selected fishing areas in water 66. Float has a one-piece body 21 of lightweight material, such as balsa wood, foam plastic and the like. Body 21 has a density less than the density of water 66 and is used to buoy up baited end 67 of fishing line 64.

Body 21 has a generally elongated cylindrical shape with a tapered forward end 22 and a tapered rear end 23 each having generally truncated cone shapes. The shape of body 21 enables float to move through water 66 with a minimum of resistance. A series of contrasting colored rings 24, 26, 27 are located on forward end 22 of body 21. Preferably ting 24 is orange colored, ring 26 is yellow colored and ring 27 is black colored. Other colored rings can be used to color forward end 22 of body 21. Rear end 23 of body 21 is stained with a natural wood color, such as brown. A clear urethane coating is then applied to rear end 23 of body 21 to protect the brown color. The colors and designs on body 21 are not part of the present invention.

A generally flat, longitudinal fin or keel 28 extends downwardly from the central bottom portion of body 21. Keel 28 is used to control the location and movement of float 20 in water 66 relative to boat 61 thereby move buoyed baited end 67 of fishing line 64 to a selected position. The upper edge of keel 28 fits into a longitudinal slot 29 in the lower portion of body 21. An adhesive secures keel 28 to body 21. Keel 28 is made of semi-flexible material, such as metal or plastic, and has rearwardly tapering forward and rear edges 31 and 32 and a longitudinal linear lower edge 33. Rounded lower corners join the forward and rear edges 31 and 32 with opposite ends of lower edge 33. Keel 28 extends downwardly from body 21 at an angle of about 90 degrees with respect to the transverse center line of body 21. Keel 28 can have other sizes and shapes. For example, keel 28 can be provided with horizontal or transverse fins (not shown) to catch the water.

Figure 5:
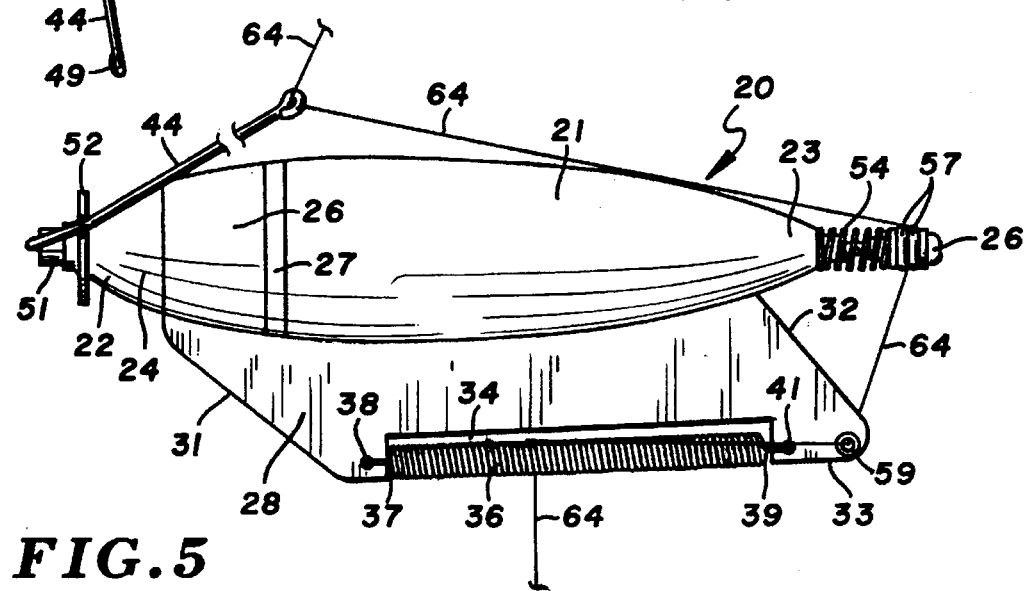
FIG. 5 is a side elevational view of the right side of the fishing float of FIG. 3.
Figure 6:
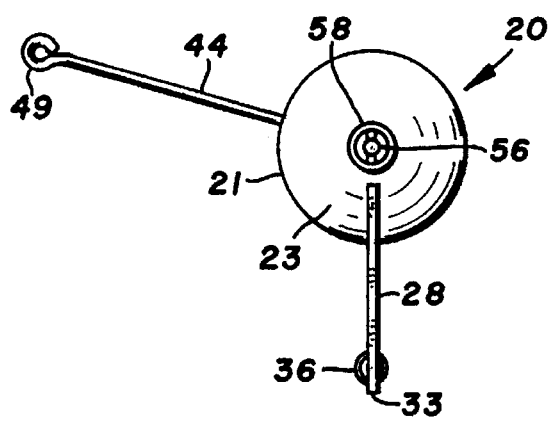
FIG. 6 is a rear elevational view of the fishing float of FIG. 4.
Figure 7:
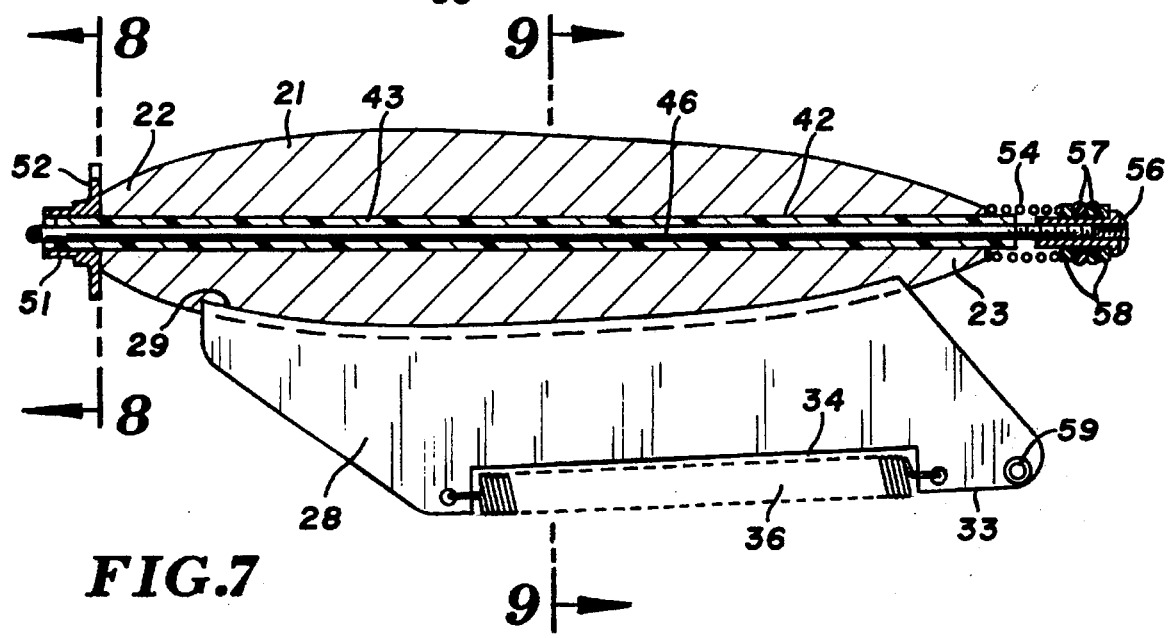
FIG. 7 is a sectional view taken along the line 7—7 of FIG. 4.
Figure 8:
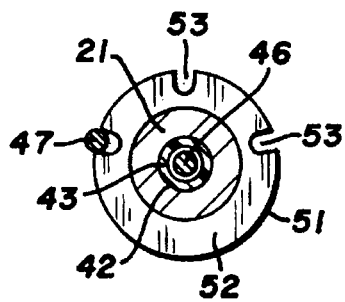
FIG. 8 is a sectional view taken along the line 7—7 of FIG. 6.
Figure 9:
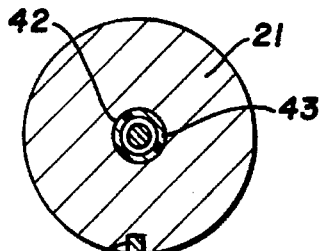
FIG. 9 is a sectional view taken along the line 9—9 of FIG. 7.
Figure 10:
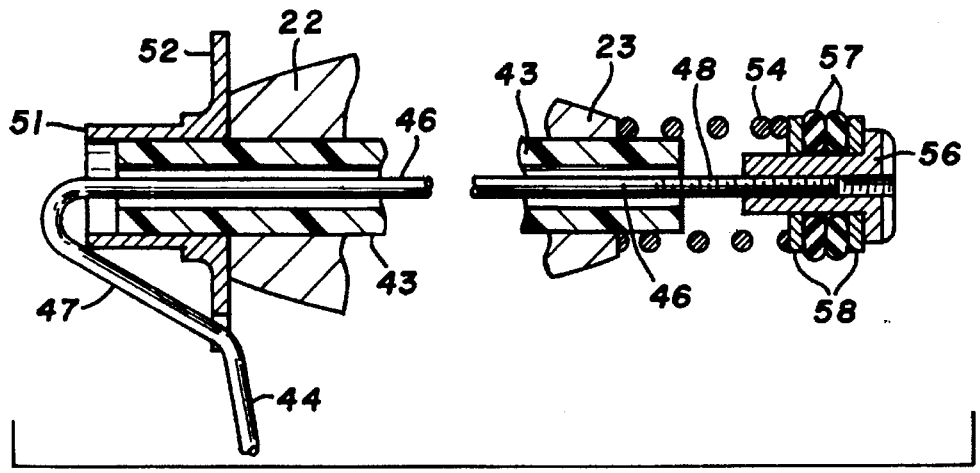
FIG. 10 is an enlarged fragmentary sectional view of the nose and tail sections of the fishing float showing the arm in the lock position.

As shown in FIG. 5, keel 28 has a generally rectangular recess 34 open to lower edge 33 accommodating a line holder, such as a coil spring 36. Line holder 36 is used to locate fishing line 64 approximately at the center of body 21 for stability of float 20 in water 66. Outer ends 37 and 39 of line holder 36 extend through holes 38 and 41 in keel 28 adjacent opposite ends of recess 34, respectively, to mount line holder 36 in assembled relation on keel 28. Holder 36 is in general alignment with lower edge 33 of keel 28. Keel 28 has a third hole 59 located rearwardly from line holder 36 adjacent lower edge 33 through which fishing line 64 is threaded before entering line holder 36.

Referring to FIGS. 7 to 11, body 21 has a longitudinal bore 42 located along its longitudinal center axis. Bore 42 has a forward section open to forward end 22 and a rear section open to rear end 23 of body 21. An elongated linear tube 43 is concentrically located within bore 42. Tube 43 is secured to body 21 with an adhesive.

A single or one-piece wire 46 is extended through tube 43. Wire 46 has a forward section 47 extended through forward end 22 of body 21 that bends rearwardly adjacent body 21. An outwardly directed end or arm 44 of wire 46 inclines rearwardly and away from forward section 47 and body 21. The distal end of arm 44 terminates in a loop 49. The opposite end of wire 46 includes a threaded rear section 48 which extends through rear end 23 and rearwardly of body 21.

A cap 51 is located on forward end 22 of body 21. Cap 51 has an outwardly directed annular flange 52 having a plurality of notches 53. Forward section 47 of wire 46 is locatable in notches 53 to hold arm 44 at selected positions relative to body 21 and keel 28. Arm 44 is moveable between left and right angular positions and a center position, as shown in broken lines in FIG. 3. Flange 52 can be provided with several notches to allow and 44 to be located in various angular positions relative to body 21.

A screw 56 having an inner threaded passage is threaded on rear section 48 of wire 46. A spring 54 surrounding rear section 48 engages screw 56 and rear end 23 of body 21 to bias forward section 47 of wire 46 into notches 53 of cap 51. A pair of grommets 57 are located between washers 58 on screw 56. A selected intermediate portion of fishing line 64 is held between grommets 57 to locate baited end 67 of line 64 at a desired depth from the surface of water 66. Spring 54 is used to bias grommets 57 together. Preferably grommets 57 are made of rubber to eliminate damage to fishing line 64.

In use, fishing float 20 is located on fishing line 64 which is attached to a fishing reel mounted on fishing pole 63. End 67 of fishing line 64 is pulled through end loop 49 in arm 44 until a selected intermediate portion of line 64 is located adjacent grommets 57 whereby end 67 of line 64 would be located at a desired depth when float 20 and line 64 are deposited in water 66. The selected intermediate portion of fishing line 64 is then placed between grommets 57 and end 67 is threaded through hole 59 and recess 34 in keel 28. Fishing line 64 is placed between the coils of line holder 36 to locate the downward pulling force of end 67 of line 64 approximately at the center of body 21, as shown in FIG. 5. The location of line 64 in holder 36 can be adjusted to achieve maximum balance and stability of float 20 in water 66 as conditions require. Arm 44 is moved to the left angular position, center position, or right angular position, as shown by the broken lines in FIG. 3, to adjust the angle at which water 66 moves in relation to keel 28 thereby controlling the location and movement of float 20 in water 66. End 67 of fishing line 64 is baited and deposited into water 66. Fisherperson 62 operates the fishing reel attached to pole 63 to release additional fishing line 64 from the reel or to wind line 64 back onto the reel to locate float 20 and baited end 67 at selected positions in water 66.

Figure 11:
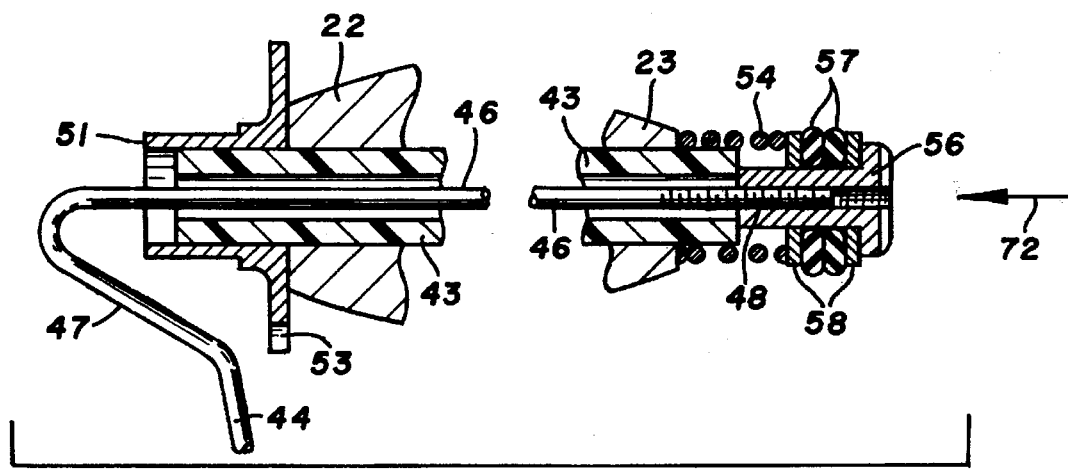
FIG. 11 is a sectional view similar to FIG. 10 showing the arm in the release position.

Rear section 48 of wire 46 is moved inwardly, as indicated by arrow 72 in FIG. 11, to move the forward section 47 forwardly to a release position away from cap 51 allowing rotation of wire 46 relative to body 21. Arm 44 is then rotated to the selected position and force 72 is removed from rear section 48. Spring 54 pulls forward section 47 of wire 46 to a lock position into one of notches 53 of cap 51. Screw 56 is tightened on rear section 48 to prevent forward movement of wire section 47 locking the position of arm 44 relative to body 21 and prevent line 64 from slipping through grommets 57.

Referring to FIG. 1, the flow of river water 66 in the direction of arrow or current 73 moves water 66 against keel 28 of float 20. When arm 44 is located in one of the angular positions relative to keel 28, the flow of water 66 forces keel 28 into an angular relation with current 73 causing float 20 to be located between approximately 45 degrees and perpendicular relative to the position of anchored boat 62 in river 66. The location of float 20 and baited end 67 can be adjusted generally laterally closer to and away from boat 62 by winding line 64 back on the fishing reel or releasing additional line 64 from the reel, as indicated by arrows 68 and 69 in FIG. 1. In like manner, float 20 can also be used to locate baited end 67 between approximately 45 degrees and perpendicular to positions on the bank of a river or stream.

Arm 44 can be repositioned to the center position located along the vertical longitudinal plane of keel 28 to use float 20 as a standard fishing float or bobber. When arm 44 is located in the center position, current 73 carries float 20 downstream in general longitudinal alignment with anchored boat 62. The flow of water 66 past body 21 and keel 28 imparts intermittent movement to float 20 giving life-like movement to baited end 67. With arm 44 in the center position, it is also possible to fish from a bridge or other structure extending across river 66.

Figure 2:
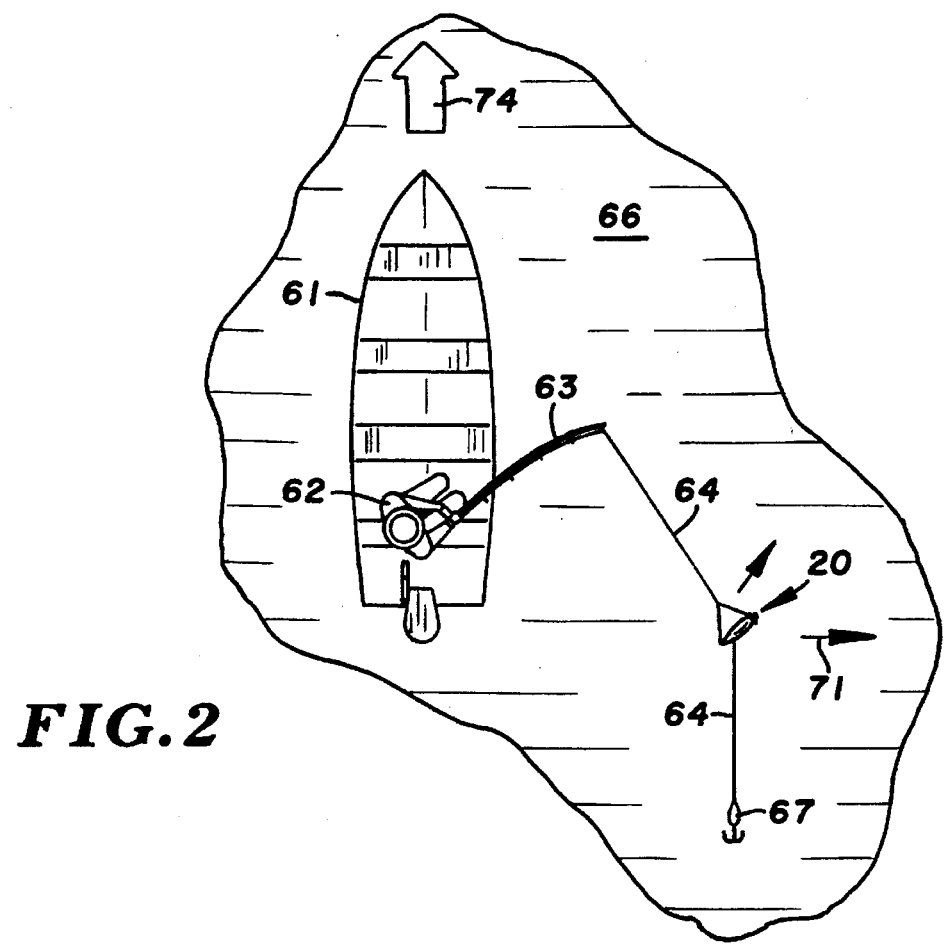
FIG. 2 is a diagrammatic plan view of the fishing float of the invention used by a fisherperson trolling in a boat.
Figure 3:
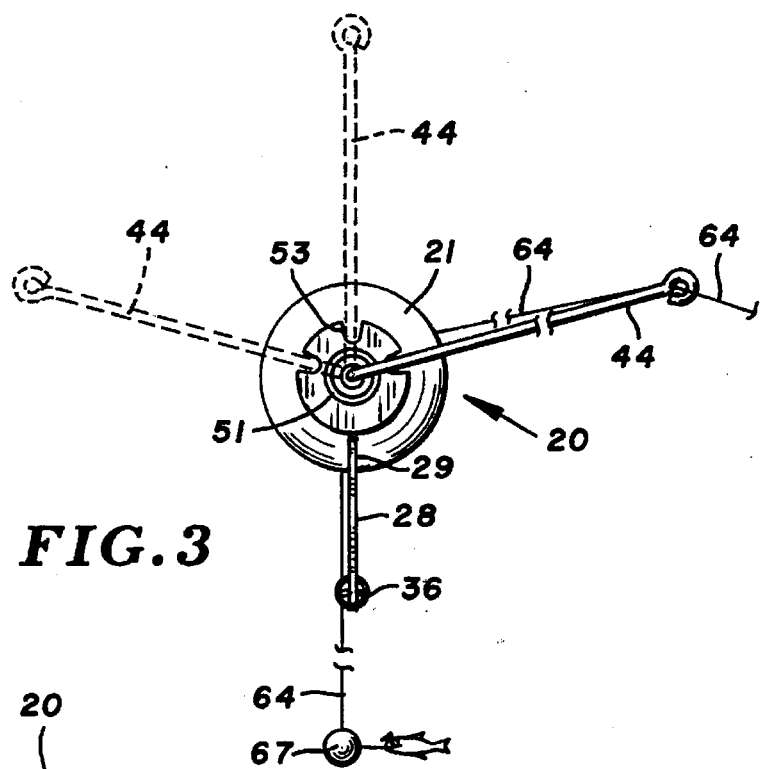
FIG. 3 is an enlarged front elevational view of the fishing float of FIG. 1.
Figure 4:
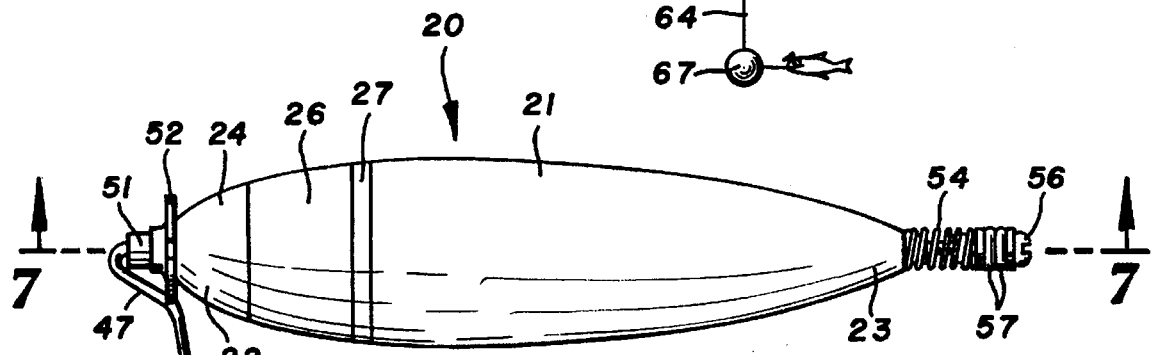
FIG. 4 is a top plan view of the fishing float of FIG. 3.

Referring to FIG. 2, the movement of boat 62 while trolling in the direction of arrow 74 pulls float 20 through water 66. When arm 44 is located in an angular position relative to keel 28, the movement of float 20 through water 66 forces keel 28 into an angular relation with the forward motion of boat 62 causing float 20 to slide laterally, as indicated by arrow 71 in FIG. 2. This spreads or swings baited end 67 of fishing line 64 away from the boat's wake into a selected location in water 66 whereby fish are less likely to be spooked by the boat motor. Fishing adjacent shallow underwater structure, such as weed lines and rock piles, is facilitated since boat 62 can be trolled in deeper water away from the underwater structure generally parallel to a desired fishing zone with float 20 pulling baited end 67 of line 64 to the side in alignment with the desired fishing zone.

Referring to FIGS. 12 to 17, there is shown a modification of the fishing float of the invention indicated generally at 100 having a one-piece body 121 of lightweight buoyant material. Body 121 has an elongated cylindrical shape with a tapered forward end 122 and a tapered rear end 123. Each of ends 122 and 123 of body 121 has a generally truncated cone shape. A series of contrasting colored rings 124, 126 and 127 are painted on forward end 122. Preferably ring 124 is orange colored, ring 126 is yellow colored and the color of ring 127 is black. Other colored rings can be used to color end 122. Rear end 123 of body 121 has a natural wood color, such as a brown color. A clear coating of urethane is applied to rear end 123 for protection of the brown color.

Figure 13:
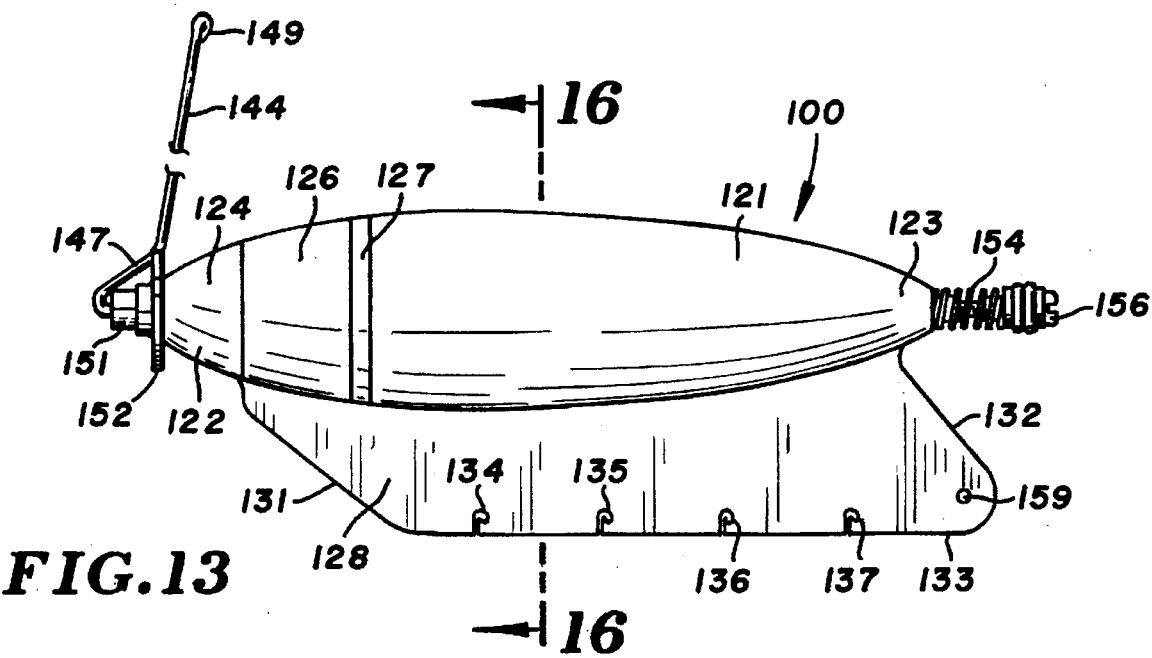
FIG. 13 is a side elevational view of the fishing float of FIG. 12.

Referring to FIG. 13, a generally flat, longitudinal fin or keel 128 extends downwardly from the center of the bottom of body 121. Keel 128 is secured to body 121 with an adhesive. Keel 128 is made from a semi-flexible sheet metal material having rearwardly tapering front and back edges 131, 132 and a longitudinal linear lower edge 133. Keel 128 can have other shapes and be made from other materials, such as plastic. Keel 128 extends downwardly from body 121 generally perpendicular to the transverse center line of body 121 and functions to control the location and movement of float 100 in water 66 thereby move the buoyed baited end of a fishing line attached to float 100 to a selected fishing position or zone.

Figure 17:
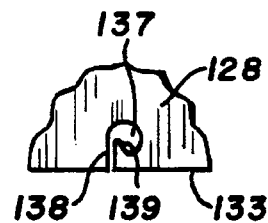
FIG. 17 is an enlarged side elevational view of a lower edge portion of the keel of the fishing float of FIG. 13.
Figure 18:
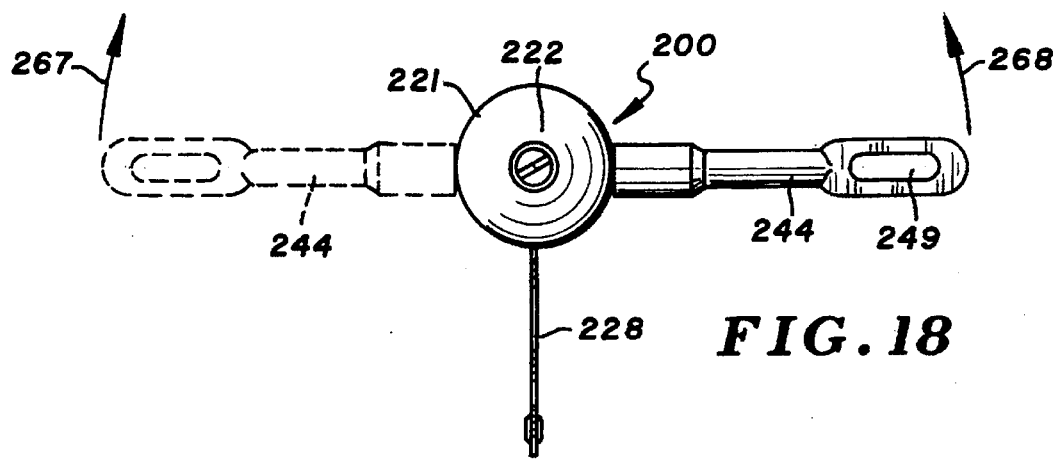
FIG. 18 is a front elevational view of a second modification of the fishing float of the invention.

A plurality of laterally spaced holes 134, 135, 136 and 137 in keel 128 are located adjacent lower edge 133. Holes 134–137 are adapted to selectively accommodate and locate the fishing line approximately at the center of body 121 for stability of float 100. As shown in FIG. 17, a relatively narrow passage 138 extends downwardly from hole 137 to lower edge 133. Fishing line can be pulled through passage 138 into hole 137. A finger 139 projects upwardly into hole 137 adjacent passage 138 to hold the line in hole 137. The fishing line can be moved from hole 137 to an adjacent hole 134–136 by lifting the line up and over finger 139 and then down through passage 138 without pulling the end of the line back through hole 137. Passages identical to passage 138 connect holes 134–136 with the lower edge 133. Fingers projecting into holes 134–136, substantially the same as finger 139 projecting into hole 137, hold the fishing line in holes 134–136. The fishing line is moved between holes 134–137 to achieve overall balance and stability of float 100 in water as conditions require.

Figure 16:
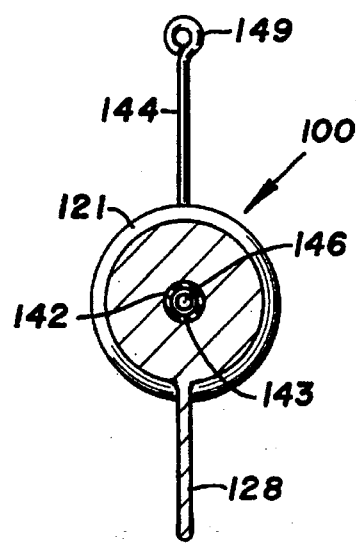
FIG. 16 is a sectional view taken along the line 16—16 of FIG. 13.

Referring to FIG. 16, body 121 has a longitudinal bore 142 located along the longitudinal center axis of the body. Bore 142 is open to forward and rear ends 122, 123 of body 121. An elongated linear tube 143 is fitted into bore 142 and secured thereto with an adhesive. A single or one-piece wire 146 extends through tube 143. Wire 146 has a forward section 147 that inclines rearwardly adjacent forward end 122 of body 121. As shown in FIG. 13, wire 146 has an outwardly directed end or arm 144 that extends rearwardly and away from forward section 147 and body 121. The outer end of arm 144 terminates in a loop 149. Fishing line is threaded through loop 149 and placed between a pair of grommets 157 surrounding the rear section of wire 146, and then through a hole 159 in the lower rear section of keel 128. The line is then pulled into one of holes 134–137 adjacent lower edge 133 of keel 128.

Figure 12:
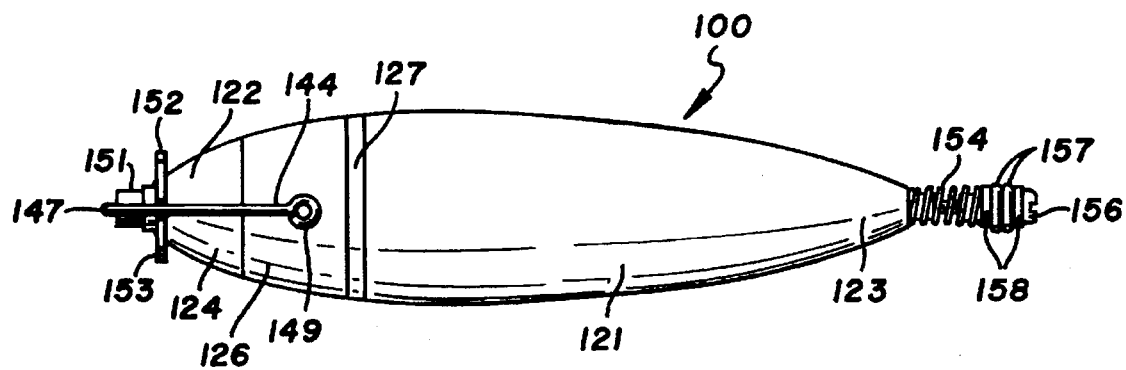
FIG. 12 is a top view of a modification of the fishing float of the invention.
Figure 14:
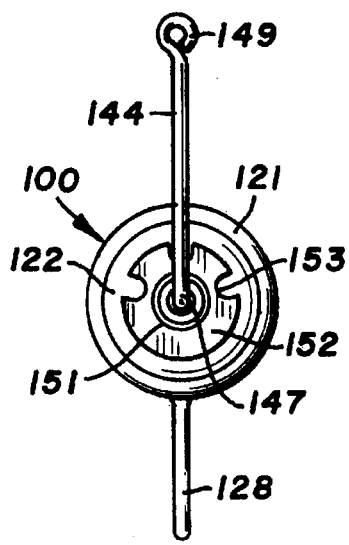
FIG. 14 is a front elevational view of the fishing float of FIG. 12.
Figure 15:
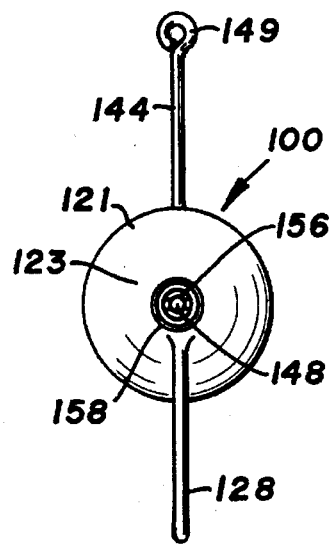
FIG. 15 is a rear elevational view of the fishing float of FIG. 12.

Referring to FIGS. 12 and 14, a cap 151 is mounted on forward end 122 of body 121. Cap 151 has an outwardly directed annular flange 152 having a plurality of notches 153. Forward section 147 of wire 146 fits into notches 153 to hold arm 144 at selected positions relative to body 121 and keel 128. A screw 156 having an internal threaded passage is threaded on the rear section of wire 146 to hold spring 154 on wire 146. Spring 154 engages washer 158 surrounding screw 156 and rear end 123 of body 121 to bias forward section 146 of wire 146 into notches 153 of cap 151. Grommets 157 are located on screw 156 between washers 158. A selected intermediate portion of the fishing line is held between grommets 157 to locate the baited end of the line at a desired depth from the surface of the water being fished. Alternatively, the end of the fishing line can be secured adjacent rear end 123 between grommets 157 and a second piece of fishing line or leader can be secured to one of holes 134–137 to locate the baited end of the line at the desired water depth. Spring 154 is used to bias grommets 157 into gripping relation with the fishing line.

Arm 144 is moveable between left and right angular positions and a center position to adjust the angular relation at which keel 128 moves in relation to water 66 being fished. Applying inward pressure on screw 154 moves forward section 147 of wire 146 forwardly to a release position away from cap 151 which allows rotation of arm 144. Screw 156 can be tightened on the rear section of wire 146 to prevent forward movement of wire section 147 and lock the position of arm 144 relative to body 121. With arm 144 in either the left or right angular position keel 128 is forced into an angular relation with current 73 of water 66 causing float 100 to be located generally transverse to a stationary position of a fisherperson, such as in an anchored boat or on a river bank. Moving arm 144 to a center position located along the vertical longitudinal plane of keel 128 allows float 100 to be used as a standard float whereby the current of the water carries float 100 downstream for fishing in general longitudinal alignment with a stationary position of the fisherperson, such as in a boat or on a bride crossing the river.

When fishing by trolling, arm 144 is moved to one of the angular positions. Float 100 is pulled through the water forcing keel 128 into an angular relation relative to the forward trolling motion of the boat. This causes float 100 to slide laterally and spread or swing the baited end of the fishing line away from the boat's wake and in alignment with a selected fishing zone, such as adjacent a weed line or rock pile.

Referring to FIGS. 18 to 22, there is shown a second modification of the fishing float of the invention indicated generally at 200 for use by a fisherperson to guide the baited end of a fishing line into desired fishing areas in a lake or a river. Float 200 has an elongated cylindrical shaped body 221 having a forward tapered end 222 and a rear tapered end 223 mounted on opposite ends of an elongated tubular shaft 243. An annular collar 262 is mounted on shaft 243 between forward end 222 and rear end 223 of body 221. The outer diameter of collar 262 is substantially the same as the diameter of body 221 adjacent the inner portions of ends 222 and 223. Collar 262 is connected to an outwardly directed, generally linear arm 244 that extends normal to the longitudinal center axis of body 221. Collar 262 is rotatable on shaft 243 whereby arm 244 may be moved between a left angular position and a right angular position, as indicated by arrows 267 and 268 in FIG. 18.

Figure 19:
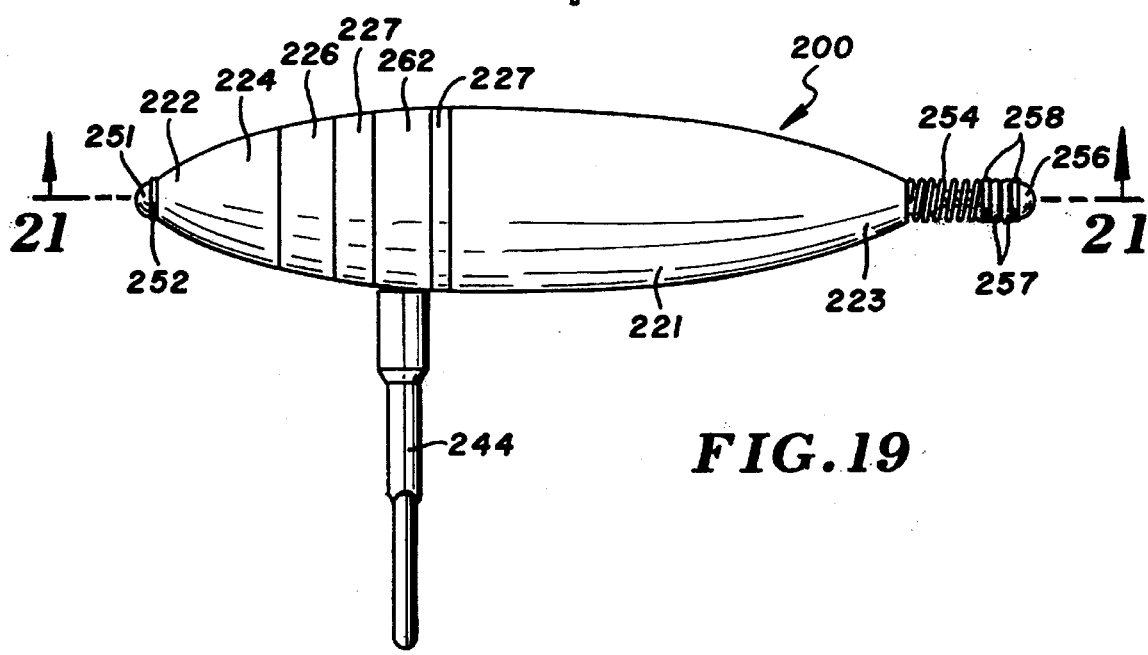
FIG. 19 is a top view of the fishing float of FIG. 18.

Referring to FIG. 19, forward end 222 of body 221 is painted with an orange colored ring 224, yellow colored ring 226 and a black colored ring 227. The outer surface of collar 262 is painted black to match the black color of ring 227. Rear end 223 is stained with a brown color and treated with a clear coating of urethane. The forward section of rear end 223 is also painted black to match the black colors of collar 262 and ring 227. Other colors can be used to color body 221.

Figure 20:
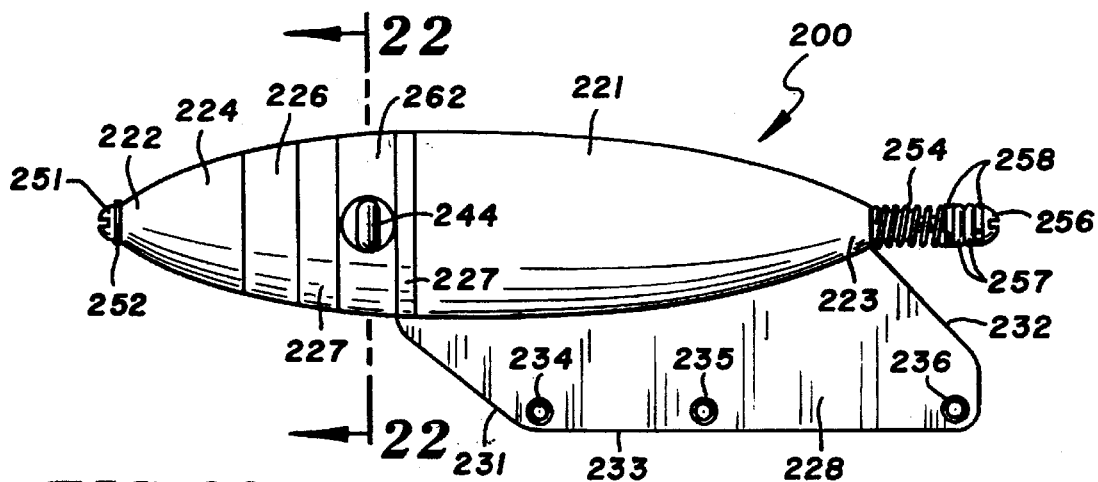
FIG. 20 is a side elevational view of the fishing float of FIG. 18.
Figure 21:
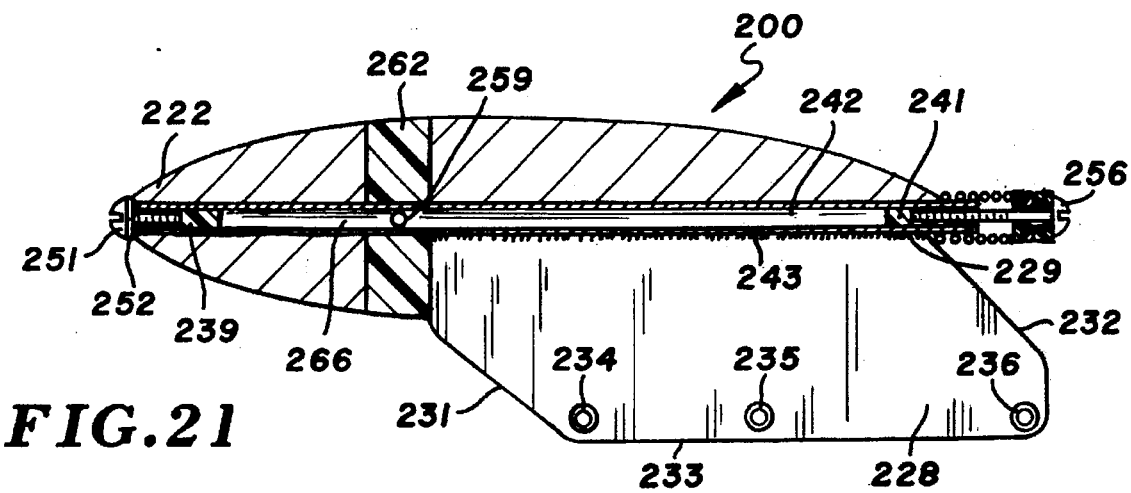
FIG. 21 is a sectional view taken along the line 21—21 of FIG. 19.

Referring to FIGS. 20 and 21, a generally flat, longitudinal keel 228 is secured to shaft 243 with a solder joint 229) or the like and extends downwardly through a longitudinal slot in rear end 223. Keel 228 has rearwardly tapering front and back edges 231 and 232 and a longitudinal linear lower edge 233. Keel 228 functions to control the location and movement of float 200 in water 66 so as to position the baited end of a fishing line in selected fishing areas. Keel 228 has a series of holes 234, 235 and 236 located along lower edge 233. Fishing line is threaded through holes 234–236 to balance and stabilize float 200 as desired.

Referring to FIG. 21, each end 222, 223 of body 221 and collar 262 has a longitudinal passage located along its longitudinal center axis forming a longitudinal bore 242 to accommodate shaft 243. Screws 251 and 256 are threadably received within the opposite ends of shaft 243 to hold forward end 222, collar 262 and rear end 223 in assembled relation on shaft 243. Washer 252 on screw 251 together with (cylindrical inserts 241) and 239 located adjacent the ends of shaft 243 prevent water from entering passage 266 of shaft 243 causing instability of float 200.

Figure 22:
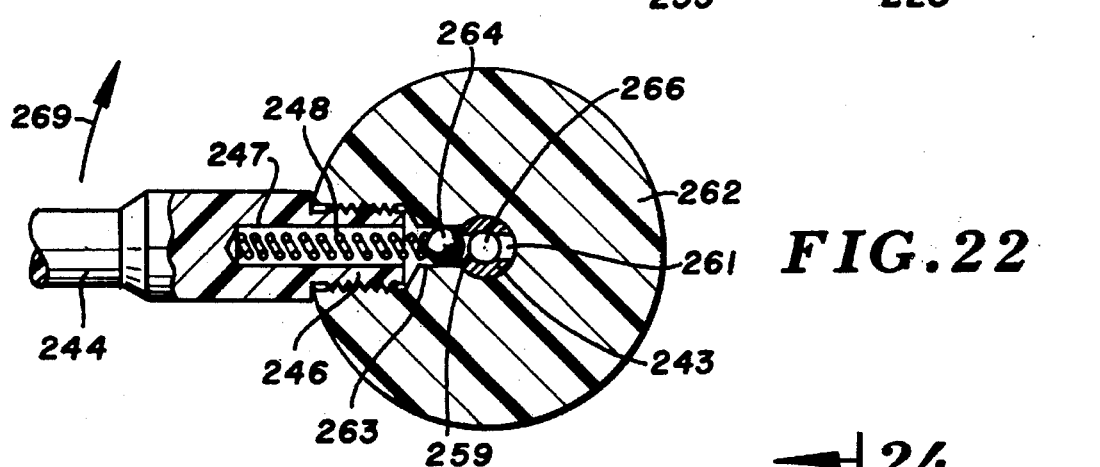
FIG. 22 is an enlarged sectional view taken along the line 22—22 of FIG. 20.

Referring to FIG. 22, collar 262 has a transverse bore 263 extending normal to the longitudinal center axis of collar 262 and open to the longitudinal passage of collar 262. Inner end 246 of arm 244 is threaded into the outer end of bore 263 to secure arm 244 to collar 262. Arm 244 extends transversely away from collar 262 and body 221. The outer end of arm 244 terminates in a loop 249. Fishing line is placed through loop 249 and then between O-rings or grommets 257 that surround screw 256 adjacent rear end 223 of body 221. A spring 254 located on screw 256 forwardly of grommets 257 and washer 258 functions to hold grommets 257 tightly together whereby grommets 257 grip the fishing line. The line is then threaded through one of the holes 234–236 in the lower end of keel 228, baited and deposited into water 66. Screw 256 can be tightened on the rear end of shaft 243 to lock the position of the fishing line between grommets 257. In this manner, grommets 257 hold the fishing line at a selected intermediate position whereby the baited end of the line is located at a desired depth in water 66. Keel 228 is forced into an angular relation with respect to the forward motion of boat 62 or the downstream movement of current 73 causing float 200 to slide laterally permitting selected areas of water 66 to be fished from a position generally transversely located from the selected area of the water.

As shown in FIG. 22, the inner end of bore 263 in collar 262 has a reduced diameter section accommodating a ball 264. A coil spring 248 located in a recess 247 in inner end 246 of arm 244 is used to bias ball 264 into engagement with the outer surface of shaft 243 that extends through collar 262. Shaft 243 has a pair of oppositely disposed concave shaped notches 259 and 261 adjacent the inner end of bore 263 for holding spring-operated ball 264 thereby positioning arm 244 in the left angular position and right angular position relative to body 221, respectively. Ball 264 is released from notch 259, 261 by a rotational force, indicated by arrow 269 in FIG. 22, applied to arm 244. Collar 262 is then rotated on shaft 243 to move arm 244 to the opposite angular position.

Figure 23:
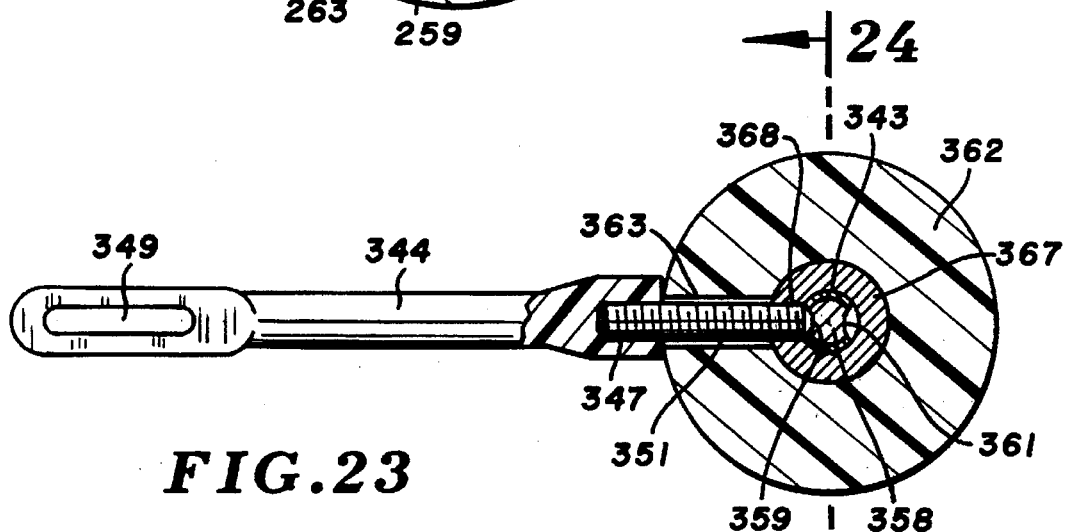
FIG. 23 is an enlarged sectional view similar to FIG. 22 showing a modification of the arm connection to the body of the fishing float of FIG. 18.
Figure 24:
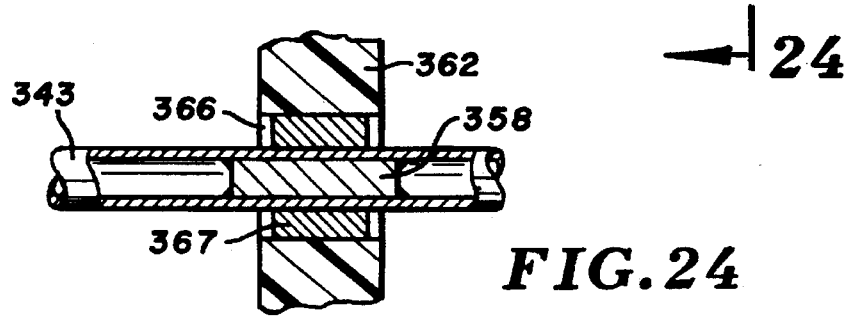
FIG. 24 is a sectional view of the center portion of the fishing float taken along the line 24—24 of FIG. 23.

Referring to FIGS. 23 and 24, there is shown a modification of fishing float 200 having an elongated tubular linear shaft 343. An annular collar 362 mounted on shaft 343 is connected to an outwardly directed and generally linear arm 344. Arm 344 extends normal to the longitudinal center axis of shaft 343. Collar 362 is rotatable on shaft 343 whereby arm 344 can be moved between left and right angular positions. The inner end of arm 344 has a recess 347 having internal threads that accommodate one end of a threaded bolt 351 which is used to secure arm 344 to collar 362. The outer end of arm 344 forms a loop 349 to receive fishing line.

Collar 362 has a longitudinal center passage 366 accommodating an annular sleeve 367. Sleeve 367 has a transverse threaded bore 368 located in alignment with a transverse bore 363 in collar 362. Bolt 351 extends through bore 363 and is threaded into bore 368 in sleeve 367 thereby attaching arm 344 to collar 362. Rotating bolt 351 further inwardly causes the inner end bolt 351 to move into engagement with the outer surface of shaft 343 extending through sleeve 367. Shaft 343 has a generally cylindrical insert 358 having a pair of concave shaped notches 359 and 361 located on opposite sides thereof. Notches 359 and 361 accommodate the inner end of bolt 351 for locking the position of arm 344 in the left and right angular positions relative to the body of the fishing float.

The inner end of bolt 351 is released from notch 359, 361 by turning bolt 351 outwardly away from shaft 343. Collar 362 and sleeve 367 can then be rotated on shaft 343 to move arm 344 to the opposite angular position wherein bolt 351 is then rotated inwardly to place the inner end of bolt 351 in the corresponding notch 359, 361 to lock the position of arm 344.

Referring to FIGS. 25 to 28, there is shown a further modification of the fishing float of the invention indicated generally at 400 for use by a fisherperson to guide the baited end of a fishing line 464 into desired fishing areas in a lake or a river. Float 400 has an elongated cylindrical shaped body 421 having a forward tapered end 422 and a rear tapered end 423 mounted on opposite ends of an elongated tubular shaft 443. Forward end 422 and rear end 423 of body 421 are stained with a brown color and treated with a clear coating of urethane. The rear section of forward end 422 and the forward section of rear end 423 are painted black. Other colors can be used to color body 421. Float body ends 422 and 423 are made of lightweight buoyant material, such as balsa wood and the like.

Shaft 443 has a front portion and a rear portion connected to opposite sides of a generally cube-shaped connector 436. Connector 436 has an upright bore accommodating upright inner end 446 of arm 444. A tubular sleeve 437 having a passage aligned with the bore in connector 436 is joined to the bottom of connector 436. The bottom edge of sleeve 437 has a pair of oppositely disposed V-shaped notches 459 and 461 for holding a spring-operated transverse retainer pin 463 extending through the lower portion of inner end 446 of arm 444.

Float 400 has an arm 444 rotatably mounted on body 421. Arm 444 has a generally linear outer end 447 that extends outwardly from upright inner end 446 and transversely from the longitudinal center axis of body 421. Arm 444 is rotatable relative to shaft 443 whereby outer end 447 of arm 444 may be moved between a left angular position and a right angular position.

Figure 25:
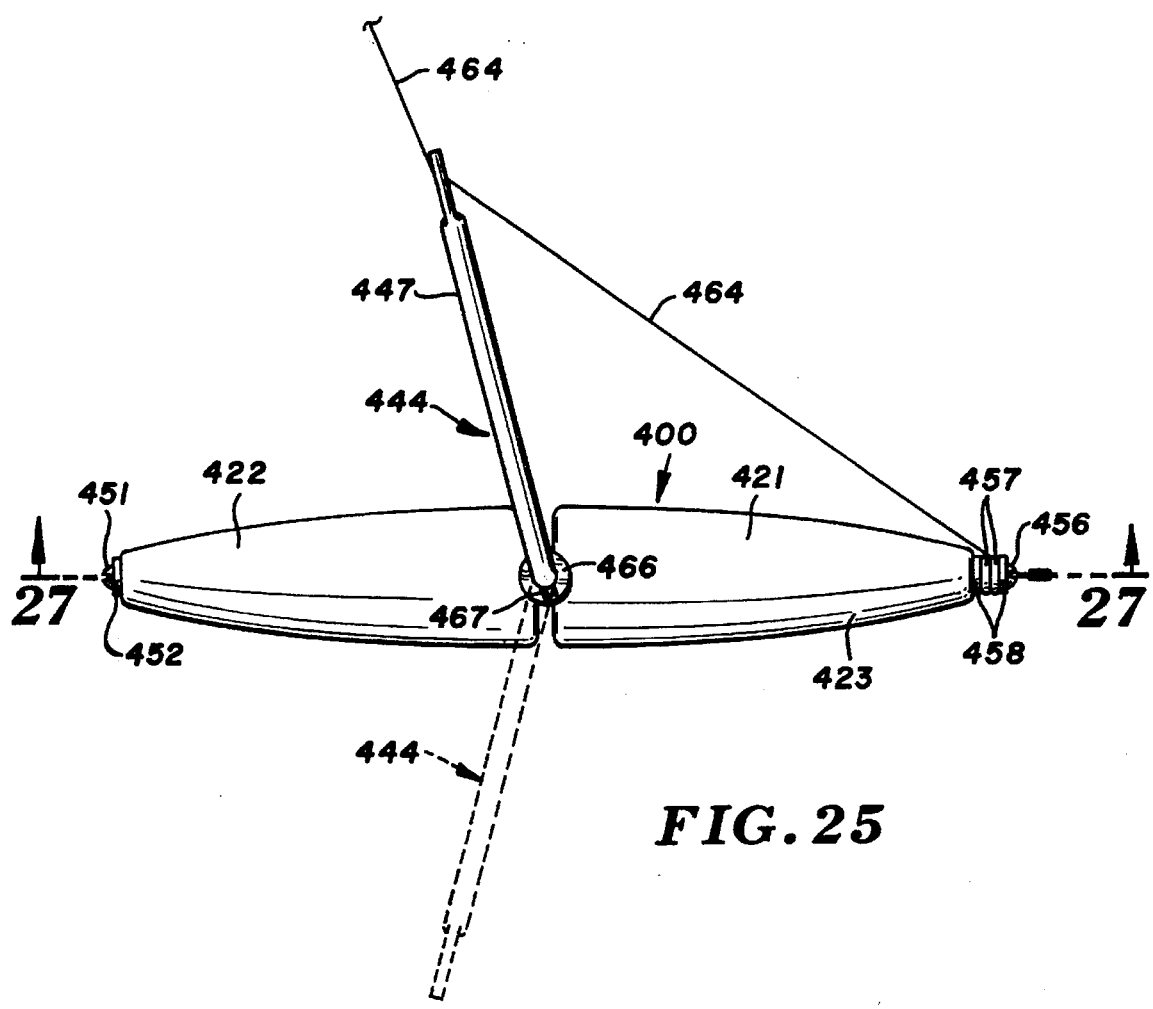
FIG. 25 is a top plan view of a further modification of the fishing float of the invention.
Figure 26:
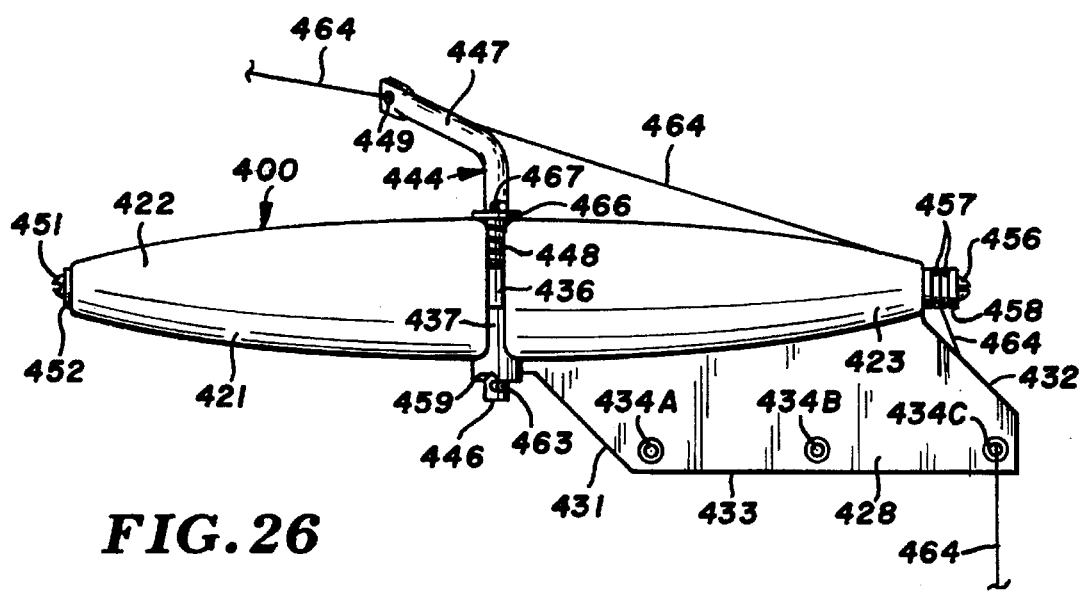
FIG. 26 is a side elevational view of FIG. 25.
Figure 27:
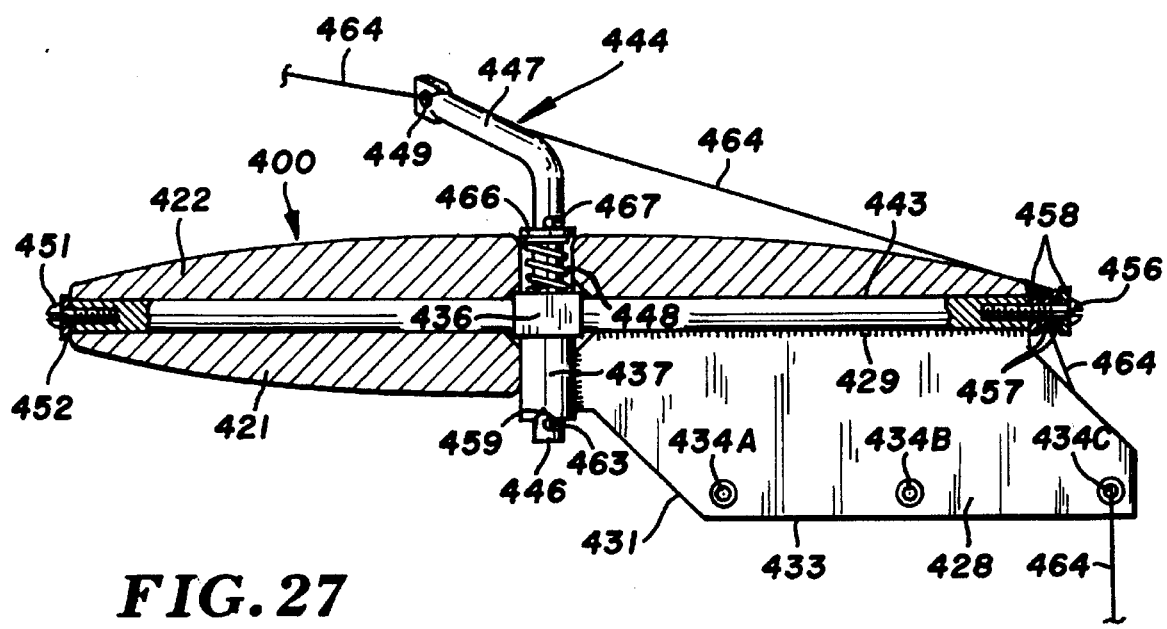
FIG. 27 is a sectional view taken along the line 27—27 of FIG. 25.

Inner end 446 of arm 444 is located in the bore in connector 436 and the tubular passage in sleeve 437. A coil spring 448 surrounding inner end 446 of arm 444 engages the top of connector 436 to bias pin 463 into engagement with notches 459 and 461 in sleeve 437 thereby positioning arm 444 in a left angular position or right angular position relative to body 421, as desired. A second pin 467 extends through an opening in inner end 446 adjacent a washer 466 to hold spring 448 on arm 444. The angular positions of arm 444 are preferably 15 degrees forwardly from a vertical plane located normal to the longitudinal axis of body 421, as shown in FIG. 25. Pin 463 is released from each notch 459,
461 by a downward rotational force applied to arm 444 against the bias of spring 448. Arm 444 is rotatable within connector 436 to move arm 444 from one angular position to the opposite angular position.

A generally flat, longitudinal keel 428 is secured to shaft 443 and sleeve 437 with a solder joint 429 or the like and extends downwardly through a longitudinal slot in rear end 423. Keel 428 has rearwardly tapering front and back edges 431 and 432 and a longitudinal linear lower edge 433. Keel 428 functions to control the location and movement of float 400 in water so as to position the baited end of fishing line 464 in selected fishing areas. Keel 428 has a series of holes 434A, 434B and 434C located adjacent the lower edge 433. Fishing line 464 is threaded through one of holes 434A–434C to balance float 444 and then pulled until the end of line 464 is located at a desired depth from the surface of the water. Grommets or O-rings 457 grip fishing line 464 to hold the end thereof at the proper depth.

Each end 422, 423 of body 421 has a longitudinal passage located along its longitudinal center axis to accommodate shaft 443. Forward and rear end 422 and 423 of body 421 each has a vertical groove for accommodating connector 436 and sleeve 437. Screws 451 and 456 extended through washers 452 and 458, respectively, are threadably received within the opposite ends of shaft 443 to hold forward end 422 and rear end 423 of body 421 in assembled relation on shaft 443.

Inner end 446 of arm 444 is rotatably located in connector 436 to rotatably mount arm 444 relative to shaft 443. Outer end 447 of arm 444 extends transversely away from body 421 and terminates in a loop 449. Fishing line 464 is placed through loop 449 and then between grommets 457 that surround screw 456 adjacent rear end 423 of body 421. Screw 456 is tightened on the end of shaft 443 to hold grommets 457 tightly together whereby grommets 457 grip fishing line 464 located therebetween. The line is then threaded through one of the holes 434A–434C in the lower end of keel 448, baited and deposited into water to be fished. When tightened on the rear end of shaft 443, screw 456 locks the position of fishing line 464 between grommets 457. In this manner, grommets 457 hold fishing line 464 at a selected intermediate position whereby the baited end of line 464 is located at a desired depth in water. Keel 428 is forced into an angular relation with respect to the forward motion of the boat or the downstream movement of water current causing float 400 to slide laterally permitting selected areas of water to be fished from a position generally transversely located from the selected area of the water.

Figure 29:
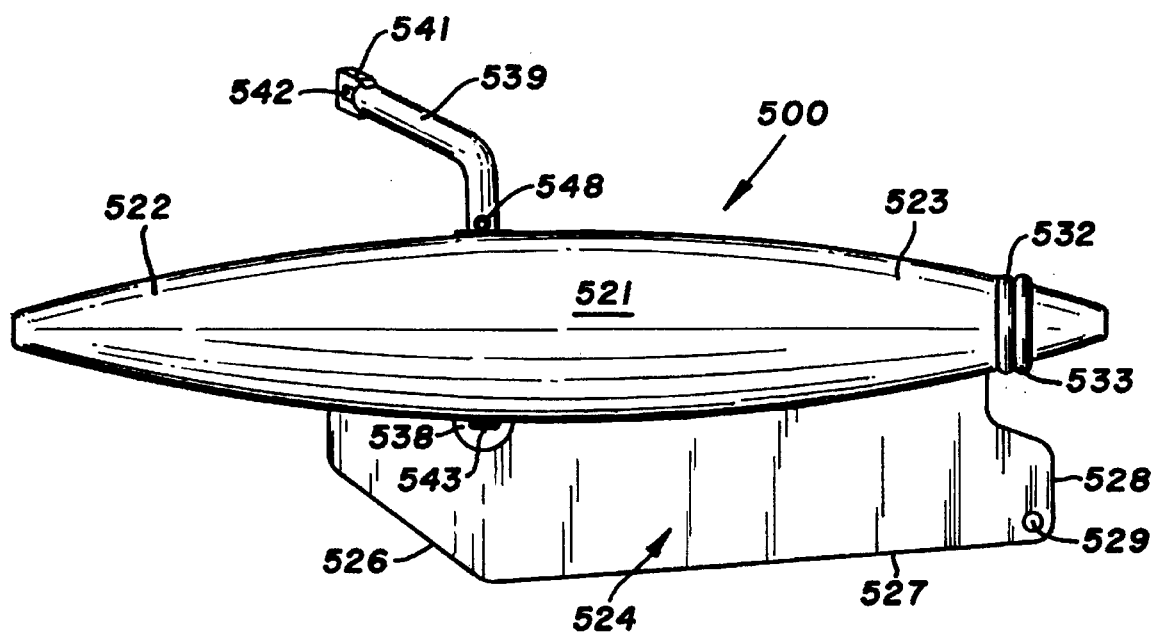
FIG. 29 is a side elevational view of another modification of the fishing float of the invention.
Figure 30:
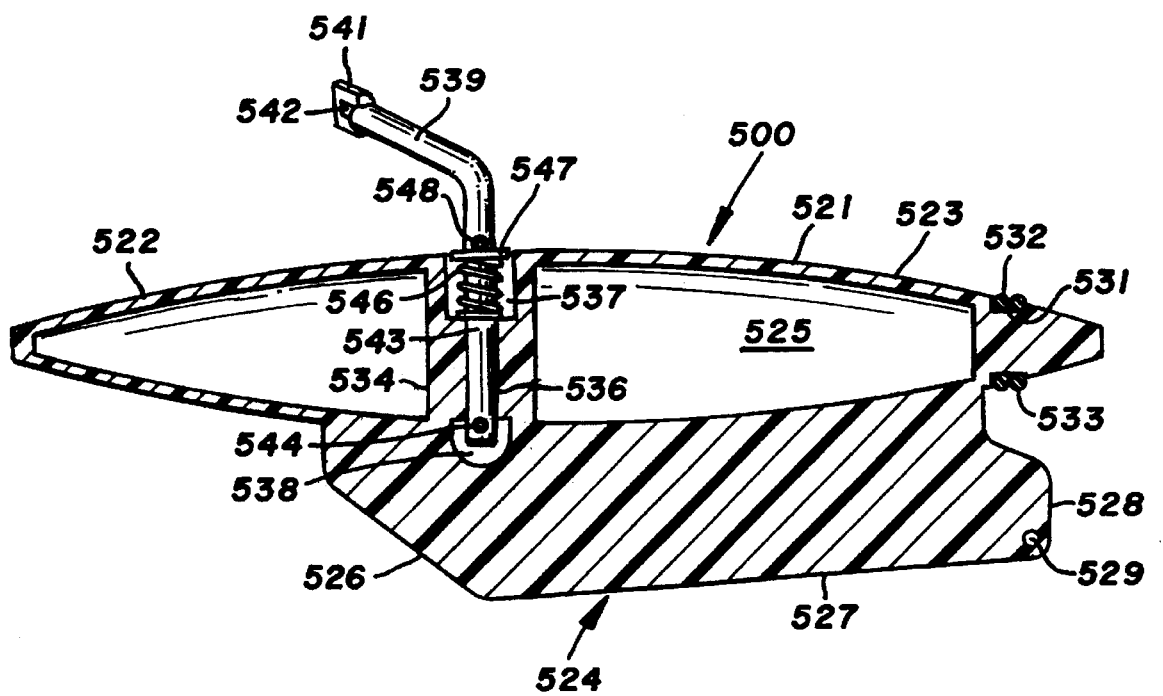
FIG. 30 is a vertical longitudinal sectional view of the fishing float of FIG. 29.

Referring to FIGS. 29 and 30, there is shown another modification of the fishing float of the invention indicated generally at 500 for use by a fisherperson to guide the baited end of a fishing line into desired fishing areas in a lake or river. Float 500 has an elongated, generally cylindrical-shaped hollow body member 521 having a forwardly tapered end 522 and a rearwardly tapered end 523. Body member 521 is joined to a generally flat longitudinal keel or fin 524. Body member 521 and keel 524 are a one piece plastic structure, such as polyethylene and like thermoplastic resins. Keel 524 is a flat blade extended downwardly from the bottom of body 521 and generally along the longitudinal center line of body 521. Body member 521 is a hollow plastic structure, as seen in FIG. 30, having an enclosed air chamber 525. The lightweight plastic of body 521 and keel 524 and enclosed air chamber 525 has a density less than the density of water so that body 521 floats on the surface of the water and holds the bait on the hook end of the fish line at a desired elevation above the bed of the body of water.

Keel 524 has a downwardly and rearwardly extended forward edge 526 joined to a generally horizontal bottom edge 527. The rear of keel 524 has a rearwardly directed tab 528 having a hole 529. Generally above hole 529, the rear end of body member 521 has an annular groove 531 accommodating a pair of flexible ring members, shown as O-rings 532 and 533. O-rings 532 and 533 are located in side-by-side positions whereby a fish line can be retained between the adjacent O-rings.

The middle portion of body member 521 has an internal upright member or portion 534 having an upright bore 536. The top of member 534 has a generally cylindrical recess 537. The bottom of bore 536 opens to a transverse hole 538 in keel 524.

Figure 28:
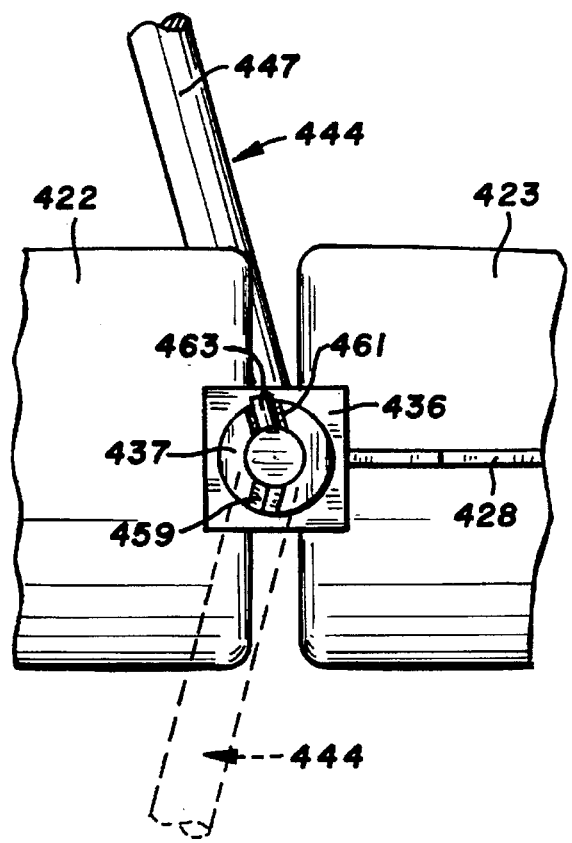
FIG. 28 is a bottom plan view of the middle section of the fishing float of FIG. 25.

Float 500 has an outwardly directed arm 539 having an outer end 541 provided with a slot 542 for accommodating a fish line from a fishing pole. Arm 539 has a downwardly directed rod member or finger 543 that extends through bore 536. A pin 544 retained in a hole in the bottom of member 534 engages one of a pair of grooves or notches in the bottom of member 534 to angularly position arm relative to body 521. The grooves in member 534 are the same as grooves 459 and 461, as shown in FIG. 28. Pin 544 is retained in operative engagement with the bottom of rod member 534 with a coil spring 546 located about rod member 543 in recess 537. The lower end of spring 546 bears against the top of member 534. The upper end of spring 546 engages a washer 547 positioned on rod member 543 with a pin 548. Pin 548 extends through a transverse hole in rod member 543.

In use, arm 539 extends laterally relative to body 521. The angular positions of arm 539 are preferably 15 degrees forwardly from the vertical plane located normal to the longitudinal axis of body 521. Lower pin 544 is released from its associated notch by downward rotational force applied to arm 539 against the biasing of spring 546. Arm 539 is rotatable relative to body 521 to move arm 539 from one angular position to the opposite angular position. Angular positions of arm 539 are the same as the angular positions of arm 444, as shown in FIG. 28. The fishing line is threaded through slot 542 and warpped between O-rings 532 and 533. The line is then threaded through hole 529 and extends downwardly to the lure or live bait associated with the hook at the end of the line. O-rings 532 and 533 hold the fishing line at selected intermediate positions whereby the baited end of the line is located in the desired depth of water. Keel 524 is located in an angular relation with respect to the forward motion of the boat or the downstream movement of the water current causing float 500 to move laterally permitting selected areas of water to be fished from a position generally transversely located relative to the selected area of the water.

While them have been shown and described embodiments of the fishing float, it is understood that changes in materials, structure, and shapes may be made by those skilled in the art without departing from the invention. The invention is defined in the following claims.

I claim:

1. A float attachable to a fishing are to buoy up a baited end of the fishing line and maneuver the baited end into desirous fishing zones in water, comprising: body means having a bottom portion, keel means projecting from the bottom portion and operable to cut through the water to guide and provide directional stability to the body means thereby controlling the location and movement of the baited end of the fishing line in the water, arm means rotatably mounted on the body means, the arm means being a one-piece wire having a first section and a second section outwardly and rearwardly inclined relative to the first section, the body means having a longitudinal center axis and generally tubular bore located along said longitudinal center axis rotatably accommodating the first section of the wire, cap means secured to the body means engageable with the arm mean to hold the arm means at selected positions relative to the body means, means biasing the arm means into engagement with the cap means, the arm means having an outer end located outwardly from the body means, the fishing line extendable through an opening in the outer end, and means for gripping a selected intermediate portion of the fishing line rearwardly from the arm means thereby determining an angle at which the keel means cuts through the water and locating the baited end at a desired depth of the water.

2. The float of claim 1 wherein: the keel means includes means accommodating the fishing line adjacent a middle portion of the body means.

3. The float of claim 1 wherein: the keel means extends downwardly normal to the longitudinal center axis of the body means.

4. The float of claim 3 wherein: the keel means is a generally flat longitudinal fin.

5. The float of claim 1 wherein: the means for gripping a selected intermediate portion of the fishing line includes a pair of ring members secured to a rear portion of the body means.

6. The float of claim 1 wherein: the body means is a generally cylindrical member.

7. The float of claim 6 wherein: the cylindrical member is made of buoyant material.

8. A float attachable to a fishing line to buoy up a baited end of the fishing line and maneuver the baited end into desirous fishing zones in water, comprising: body means having a bottom portion, a longitudinal center axis and a generally tubular bore located along said longitudinal center axis, shaft means accommodated by the bore, keel means secured to and projected downwardly from the bottom portion and operable to cut through the water to guide and provide directional stability to the body means, an arm having an upright portion and a generally lateral portion, said lateral portion having an outer end with a hole for accommodating a fishing line extended through the hole, means rotatably mounting the upright portion of the arm on the body means whereby the lateral portion of the arm extends laterally away from the body means and means mounted on the shaft means rearwardly of the arm for gripping a portion of the fishing line extended from the outer end of the lateral portion of the and rearwardly from the arm, said keel means having at least one means for accommodating the fishing line extended from the means mounted on the shaft means for gripping a portion of the fishing line thereby determining an angle at which the keel means cuts through the water and holding the baited end at a desired depth of the water.

9. The float of claim 8 including: means operable to releasably hold the arm at selected positions relative to the body means.

10. The float of claim 9 wherein: the means operable to releasably hold arm at the selected angular positions comprises detent means for positioning and holding the arm in a selected angular position relative to the body means.

11. The float of claim 8 including: means operable to releasably hold the arm at selected positions relative to the body engageable with the shaft means thereby locking the arm at the selected positions.

12. The float of claim 8 wherein: the shaft means accommodates means preventing leakage of water into the shaft means.

13. The float of claim 8 wherein: the keel means includes said at least one means for accommodating the fishing line adjacent a middle portion of the body means.

14. The float of claim 8 wherein: the keel means extends downwardly normal to the longitudinal center axis of the body means.

15. The float of claim 8 wherein: the keel means is a generally flat longitudinal fin.

16. The device of claim 8 wherein: the outer end of the arm is located forwardly and above the means for gripping a portion of the fishing line.

17. The float of claim 8 wherein: the means for gripping a portion of the fishing line includes a pair of ring members secured to a rear portion of the body means.

18. A floatation device for a fishing line comprising: body means having a front section and a rear section mounted on a generally tubular shaft, the rear section having a bottom portion, keel means attached to the shaft and projected through a longitudinal slot in the bottom portion of the rear section, arm means mounted on the shaft and rotatable relative to the body means, the arm means having an outer end located outwardly from the body means, the outer end of the arm means having an opening for accommodating the fishing line, and means for gripping a portion of the fishing line rearwardly from the outer end of the arm means whereby the fishing line can be maneuvered into desirous fishing zones in water.

19. The floatation device of claim 18 including: means operable to releasably hold the arm means at selected positions relative to the body means.

20. The float of claim 19 wherein: the means operable to releasably hold the arm means at the selected angular positions comprises detent means for positioning and holding the arm means relative to the body means.

21. The floatation device of claim 18 wherein: the keel means includes means for accommodating the fishing line.

22. The floatation device of claim 18 wherein: the keel means extends downwardly normal to the longitudinal center axis of the body means.

23. The floatation device of claim 18 wherein: the outer end of the arm means is located forwardly and above the means for gripping a portion of the fishing line.

* * * * *